United States Patent [19]

Hunsucker

[11] 4,298,638

[45] Nov. 3, 1981

[54] COATING COMPOSITION OF A POLYAMIDE AND 2-NITRO-2-HYDROXYMETHYL-1,3-PROPANEDIOL

[75] Inventor: Jerry H. Hunsucker, Terre Haute, Ind.

[73] Assignee: International Minerals & Chemical Corp., Terre Haute, Ind.

[21] Appl. No.: 172,627

[22] Filed: Jul. 28, 1980

Related U.S. Application Data

[63] Continuation-in-part of Ser. No. 25,642, Mar. 30, 1979, abandoned.

[51] Int. Cl.$^3$ ............................................ C08L 91/00
[52] U.S. Cl. .............................. 427/385.5; 260/18 N; 260/32.8 N; 260/33.4 R
[58] Field of Search ................... 260/404.5 PA, 18 N, 260/32.4, 32.8 N, 33.4 R; 427/385.5

[56] References Cited

U.S. PATENT DOCUMENTS 2,946,759 7/1960 Gallant ............................. 260/18 N
3,072,587 1/1963 Perkins ....................... 260/29.4 UA

*Primary Examiner*—John F. Niebling
*Attorney, Agent, or Firm*—Robert H. Dewey

[57] ABSTRACT

A liquid coating composition comprising a polyamide and 2-nitro-2-hydroxymethyl-1,3-propanediol.

11 Claims, No Drawings

4,298,638

COATING COMPOSITION OF A POLYAMIDE AND 2-NITRO-2-HYDROXYMETHYL-1,3-PROPANEDIOL

CROSS-REFERENCE TO RELATED APPLICATIONS

This application is a continuation-in-part of applicant's application Ser. No. 025,642, Mar. 30, 1979 now abandoned.

BACKGROUND OF THE INVENTION

This invention relates to a liquid coating composition. In a particular aspect, this invention relates to a composition comprising a modified polyamide and a crosslinking agent therefor.

The class of polyamide resins sold under the trademark Versamid by General Mills Chemicals, Inc., are intended for diverse coatings applications when reacted with epoxy resins as crosslinking or curing agents. These systems have been very successful, but they suffer from the disadvantage that the epoxy resins are relatively expensive. Accordingly, there is a need for a more economical system for use with polyamides.

SUMMARY OF THE INVENTION

It is an object of this invention to provide a resinous coating composition.

It is another object of this invention to provide a resinous coating composition comprising a modified polyamide.

Other objects of this invention will be apparent to those skilled in the art from the disclosure herein.

It is the discovery of this invention to provide a resinous, liquid, coating composition comprising a polyamide resin and 2-nitro-2-hydroxymethyl-1,3-propanediol in an organic solvent. These components react to form a tough, water resistant protective coating on an article to which it is applied. Because the reaction progresses at room temperature, it is contemplated that the mixture will be supplied to the user in two containers, one having the polyamide and the other having the nitrohydroxy compound. They can then be mixed shortly before use.

DETAILED DISCUSSION

The polyamides useful in the practice of this invention are thermoplastic resins represented by the formula HO—(OCRCONHR'—NH)$_n$H where R is a hydrocarbon group of indefinite configuration containing 34 carbon atoms, R' is an alkylene group, and n is the number of moles of diamine used to prepare the polyamide. These resins are disclosed in U.S. Pat. No. 2,379,413. Generally, they are prepared from a dimerized fatty acid and a polyamine e.g. ethylene diamine.

The preferred polyamides are those having molecular weights of 6000–9000 and amine values of from 85 to 400. They are marketed as Versamid 100, 115, 125 and 140 by General Mills Corporation. These polyamides have the following amine values:

| Versamid 100 | 85–95 |
| Versamid 115 | 230–246 |
| Versamid 125 | 330–360 |
| Versamid 140 | 370–400 |

Amine value is defined as the weight in milligrams of KOH having the same neutralizing capacity as a gram of resin.

The nitrohydroxy compound of the present invention is commercially available as a crystalline solid from International Minerals & Chemical Corporation. It is also known as tris(hydroxymethyl)nitromethane, or simply TN. It is also contemplated that the TN can be prepared in situ by substituting nitromethane and formaldehyde, e.g. an alcoholic solution of formaldehyde or paraformaldehyde, in a 1:3 mole ratio respectively per mole of tris(hydroxymethyl)nitromethane, and when so prepared is regarded as the obvious equivalent of the solid TN. Generally it is advantageous to adjust the pH to, e.g. 8 to 11 when preparing the TN in situ, using, e.g., sodium, potassium or lithium hydroxides or carbonates or calcium or magnesium oxide. However, such inorganic compounds will remain in the coating and may be objectionable in some applications. Accordingly, alkaline conditions are preferably achieved by adding an amine, e.g. a tertiary amine, which vaporizes during the heating period. However, undiluted nitromethane should never be mixed with an amine because a shock-sensitive mixture may result.

The reaction between TN and the polyamides of this invention occurs at ambient temperatures, but the reaction is slow and advantageously at elevated temperature up to 300° F. is used. It is contemplated, and it is an embodiment of this invention, that the composition will be most effectively used by the process of dissolving the TN and polyamide in a suitable solvent system shortly before use applying the mixture to a substrate, i.e. the surface of an article to be coated, and heating at a temperature up to 350° F. for a period of time sufficient to effect a reaction between the polyamide and the TN. At ambient temperatures the coating will require 10 hours or more for a complete cure, but at 150° F., 60 minutes is satisfactory, and at 350° F., 15 minutes is satisfactory. The coating can be applied by any convenient means including but not limited to dipping, brushing, spraying and electrostatic attraction.

The amount of TN to be used can be varied from about, e.g., from 45–50% based on the weight of the polyamide to about 200%. Or, expressed as the amount of total solids, from about 30% to about 66% by weight. Generally from 45 to 55%, based on total solids, is preferred.

A suitable solvent for the TN and polyamide includes, but is not limited to, the lower alkanols of 1 to 4 carbon atoms and ketones such as acetone, methyl ethyl ketone and methyl isobutyl ketone. TN has limited solubility in organic solvents, so in order to achieve a relatively high solids coating, it is sometimes advantageous to include some water. The amount of water, when used, is selected so as to dissolve the TN but not cause the polyamide to separate from solution.

The formulation of suitable solvent systems is known in the art and it is not intended that the invention be limited to a particular formulation. In addition, various dyes, pigments and other additives can be incorporated in the coating, as is known in the art. For example, although the TN-modified polyamide resin is useful as a coating, it can be further modified by treating with a urea resin or a melamine resin as a hardener or crosslinking aid. Such additives are preferably incorporated in the solution prior to applying to the substrate. Such a coating composition is essentially neutral as to acidity or alkalinity. However, when the TN is supplied by a mixture of nitromethane and formaldehyde, the coating composition may be mildly alkaline.

The invention can be better understood with reference to the following examples. It is understood, however, that the examples are intended only as illustration and it is not intended that the invention be limited thereby.

EXAMPLE 1

Versamid 125 polyamide, 16.2 g, having an amine value of 330–360 was mixed with varying amounts of TN at room temperature. Isopropyl alcohol, 31.0 g, was used as the solvent. Draw-downs of the resulting solution were made on standard steel panels. In one test, the solvent was allowed to evaporate at room temperature for 48 hours, then the film was tested for pencil hardness and reverse impact. Two other panels were heated at 250° F. for 15 minutes and 30 minutes respectively, then tested, and finally two more panels were heated at 300° F. for 15 and 30 minutes respectively, then tested. The results are as follows:

| Cure Temperature | 250° F. | | | 300° F. | |
|---|---|---|---|---|---|
| Cure Time | 48 Hr | 15 min | 30 min | 15 min | 30 min |
| A. TN = 7.5 g | | | | | |
| Hardness | — | B | B | F | H |
| Reverse Impact | — | 80 | 80 | 80 | 80+ |
| Color | — | Bn | Bn | | |
| B. TN = 15 g | | | | | |
| Hardness | — | HB | H | H | 2H |
| Reverse Impact | — | 25 | 35 | 65 | 50 |
| Color | — | Bn | D.Bn | Clear | — |
| C. TN = 22.0 g | | | | | |
| Hardness | 2B | | | | |
| Reverse Impact | 80 | | | | |
| D. TN = 29.0 g | | | | | |
| Hardness | B | | | | |
| Reverse Impact | 80 | | | | |

EXAMPLE 2

The experiment of Example 1 was repeated in all essential details, except that Versamid 100, 62.5 g, having an amine value of 85–95 was substituted for Versamid 125 and the amount of TN was held at 15.0 g. The amount of solvent was increased to 62.0 g. All films had a reverse impact of 80, passed the six-hour water resistance test and the 15 minute solvent resistance (methyl isobutyl ketone) test. However, none of the films were resistant to exposure to 2% acetic acid. The hardness values were as follows:

| Cure Temperature | Cure Time | Hardness |
|---|---|---|
| Room | 48 Hrs. | 3B |
| 300° F. | 15 min. | 3B |
| | 30 min. | 3B |
| 350° F. | 15 min. | B |
| | 30 min. | 2B |
| 300° F.ª | 15 min. | 5B |
| | 30 min. | 5B |

EXAMPLE 3

The experiment of Example 2 was repeated in all essential details except that Versamid 140, 14.6 g, having an amine value of 370–400, was substituted for Versamid 100. The amount of solvent was 31 g. All films passed the tests for solvent and water resistance but wrinkled in the 2% acetic acid test. The hardness and reverse impact resistance values were as follows:

| Cure Temperature | Air | 300° F. | 300° F. |
|---|---|---|---|
| Cure Time | 48 Hrs | 15 min | 30 min |
| Hardness | 2H | 3H | 4H |
| Reverse Impact | 80 | 20 | 16 |

EXAMPLE 4

The experiment of Example 3 was repeated in all essential details except that 4.0 ml of water was added to the isopropyl alcohol and the amount of TN was varied from 5.5 g (27.4% wt of total solids) to 18.0 g (55.2% wt of the total solids). A 3 mil draw-down was made on Q-panels and each panel was backed at 350° F. for 15 minutes. All firms showed a reverse impact of 80+ and, except for the one at 5.5 g TN, all showed excellent solvent resistance to methyl isobutyl ketone. At 5.5 g TN and 7.0 g TN, the films lacked water resistance, but at 9.0 g and above, water had no effect. None of the films were resistant to 2% acetic acid.

| g TN | % TN | Hardness |
|---|---|---|
| 5.5 | 27.4 | HB |
| 7.0 | 32.4 | HB |
| 9.0 | 38.1 | HB |
| 11.0 | 43.0 | H |
| 13.0 | 47.1 | 2H |
| 16.0 | 52.6 | 4H |
| 18.0 | 55.2 | 4H |

EXAMPLE 5

Versamid 125, 14.6 g, and varying amounts of TN were mixed with 31.0 g of isopropyl alcohol and 4.0 ml of water. A 3 mil thickness of each solution was drawn down on several Q-panels and each panel was baked at 150° F. Some panels were baked 60 minutes, some 90 and the others 120 minutes. All of the films had a reverse impact of 80+ and had excellent water resistance. None had resistance to 2% acetic acid. The results obtained are as follows:

| g TN | % wt TN | Hardness | Solvent Resistance |
|---|---|---|---|
| A. Cure, Time, 60 minutes | | | |
| 14.5 | 49.83 | HB | SF |
| 15.0 | 50.67 | HB | SF |
| 15.5 | 51.49 | B | NE |
| B. Cure Time, 90 minutes | | | |
| 14.5 | 49.83 | HB | NE |
| 15.0 | 50.67 | HB | NE |
| 15.5 | 51.49 | HB | NE |
| C. Cure Time, 120 minutes | | | |
| 14.5 | 49.83 | HB | NE |
| 15.0 | 50.67 | HB | NE |
| 15.5 | 51.49 | F | NE |

NE = No effect
SF = Softened film.

EXAMPLE 6

The experiment of Example 5 was repeated in all essential details except that Versamid 140 was substituted for Versamid 125. All of the films had a reverse impact of 80+ and had excellent water and solvent resistance. None of the films were resistant to 2% acetic acid. The results are as follows:

| Cure Time, min | Hardness | | |
| --- | --- | --- | --- |
|  | 50 | 90 | 120 |
| g TN 14.5 | HB | F | H |
| 15.0 | F | F | B |
| 15.5 | HB | HB | B |

EXAMPLE 7

The experiments of Examples 5 and 6 were repeated in all essential details except that the films were air dried at room temperature for 18 hours instead of being baked. Good cures were obtained. All films had good solvent and water resistance. All showed satisfactory hardness and all had a reverse impact of 80+.

EXAMPLE 8

The experiments of Examples 5 and 6 were repeated in all essential details except that the films were baked at 300° F. for 20 minutes. Film hardness was satisfactory; reverse impact was 80+ and water and solvent resistance were excellent.

EXAMPLE 9

The experiment of Example 5 was repeated in all essential details except that Versamid 115 is substituted for Versamid 125. There is obtained a film of suitable hardness and excellent water resistance.

I claim:

1. A resinous composition comprising a polyamide prepared from a dimerized fatty acid and a polyamide and modified by 2-nitro-2-hydroxymethyl-1,3-propanediol.

2. The composition of claim 1 wherein the polyamide is represented by the formula HO(OCRCONHR'—NH)$_n$H wherein R is a hydrocarbon group of indefinite configuration containing 34 carbon atoms and R' is an alkylene group and n is the number of moles of diamine used to prepare the polyamide.

3. The composition of claim 1 wherein the 2-nitro-2-hydroxymethyl-1,3-propanediol is present in an amount of from about 30% to about 66% by weight of the total solids.

4. The composition of claim 1 wherein the 2-nitro-2-hydroxymethyl-1,3-propanediol is present in an amount of from 45 to 55% by weight of the total solids.

5. The composition of claim 1 wherein the polyamide has a molecular weight of 6000–9000 and an amine value of 85–400.

6. The composition of claim 1 wherein the polyamide has an amine value of 85–95.

7. The composition of claim 1 wherein the polyamide has an amine value of 330–360.

8. The composition of claim 1 wherein the polyamide has an amine value of 370–400.

9. The composition of claim 1 wherein the 2-nitro-2-hydroxymethyl-1,3-propanediol is prepared in situ by substituting therefor on an equimolar basis nitromethane and formaldehyde in a 1:3 mole ratio respectively.

10. A process for coating an article comprising applying to the article the composition of claim 2 and heating at a temperature and for a length of time sufficient to polymerize said polyamide and 2-nitro-2-hydroxy-1,3-propanediol.

11. A liquid coating composition consisting essentially of 2-nitro-2-hydroxymethyl-1,3-propanediol and a polyamide represented by the formula HO(OCRCONHR'—NH)$_n$H in an organic solvent.

* * * * *

UNITED STATES PATENT AND TRADEMARK OFFICE
CERTIFICATE OF CORRECTION

PATENT NO. : 4,298,638
DATED : November 3, 1981
INVENTOR(S) : Jerry H. Hunsucker It is certified that error appears in the above–identified patent and that said Letters Patent are hereby corrected as shown below:

Column 2, line 27, "at" should read -- an --

Column 3, Example 2, line 61, insert -- $^a$Contained 1 g p-toluene sulfonic acid catalyst --

Column 4, line 17, "firms" should read -- films --

Column 5, line 32, Claim 1, "polyamide" should read -- polyamine --

Signed and Sealed this

Twentieth Day of April 1982

[SEAL]

Attest:

GERALD J. MOSSINGHOFF

Attesting Officer   Commissioner of Patents and Trademarks